US005577006A

United States Patent [19]

Kuc

[11] Patent Number: 5,577,006
[45] Date of Patent: Nov. 19, 1996

[54] ADAPTIVE ACOUSTIC SIGNAL TARGET DETECTION SYSTEM

[75] Inventor: Roman B. Kuc, New Haven, Conn.

[73] Assignee: Yale University, New Haven, Conn.

[21] Appl. No.: 624,652

[22] Filed: Mar. 21, 1996

Related U.S. Application Data

[63] Continuation of Ser. No. 350,278, Dec. 5, 1994, abandoned.
[51] Int. Cl.$^6$ ........................................................ G01S 15/00
[52] U.S. Cl. ............................ 367/104; 367/95; 367/103; 367/99
[58] Field of Search ................................. 367/87, 88, 95, 367/96, 99, 103, 104, 119, 120

[56] References Cited

U.S. PATENT DOCUMENTS

| 3,716,824 | 2/1973 | Dorr et al. | 367/88 |
|---|---|---|---|
| 4,982,384 | 1/1991 | Pipkin et al. | 367/95 |
| 5,025,425 | 6/1991 | Suter | 367/96 |
| 5,295,119 | 3/1994 | Sarac | 367/99 |
| 5,412,618 | 5/1995 | Gilmour | 367/104 |

OTHER PUBLICATIONS

Acoustical Imaging, vol. 16—J. M. Richardson et al—'Acoustical Recognition of Objects in Robotics' (pp. 613–620).

Acoustical Society of America, Oct. 1994—Roman Kuc—'Sensorimotor model of bat echolocation and prey capture'.

Proceedings of the IEEE International Conference on Robotics and Automation, Raleigh, NC, Mar. 31–Apr. 3, 1987—Scott A. Walter—'The Sonar Ring: Obstacle Detection For a Mobile Robot' (pp. 1574–1579).

Proceedings of the 1992 IEEE/RSJ International Conference on Intelligent Robots and Systems, Raleigh, NC, Jul. 7–10, 1992—Yoshiaki Nagashima et al —'Ultrasonic sensing for a mobile robot to recognize an environment—Measuring the normal direction of walls' (pp. 805–812); Angelo M. Sabatini—'Active Hearing for External Imaging Based on an Ultrasonic Transducer Array' (pp. 829–836); Ken Sasaki et al—'Classification of Objects' Surface by Acoustic Transfer Function' (pp. 821–828).

IEEE Journal of Robotics and Automation, vol. RA–3, No. 3, Jun. 1987—Alberto Elfes—'Sonar-Based Real-World Mapping and Navigation' (pp. 249–265).

(List continued on next page.)

Primary Examiner—Ian J. Lobo
Attorney, Agent, or Firm—Ohlandt, Greeley, Ruggiero & Perle

[57] ABSTRACT

An acoustic ranging and detection system comprises an acoustic transmitter for producing an acoustic ranging signal and first and second acoustic receivers positioned on either side of the acoustic transmitter. A support mounts the acoustic transmitter and both acoustic receivers for concurrent rotation about a central axis passing through the acoustic transmitter. A first motor is connected to the first acoustic receiver and is adapted to impart independent rotative movement thereto. A second motor is connected to the second acoustic receiver and is adapted to impart independent rotative movement thereto. A control system is responsive to echo signals from a target that are received by the first and second acoustic receivers to rotate the support to point the transmitter at the target and further operates the first and second motors to cause the respective acoustic receivers to be repositioned so as to manifest receiving beam patterns which exhibit central axes that intersect in the region of the target. A translation motor is also connected to the support so as to enable a relative translation between the target and the transmitter and receivers so as to enable a differentiation between targets appearing at approximately the same initial distance from the acoustic receivers.

9 Claims, 4 Drawing Sheets

OTHER PUBLICATIONS

IEEE Transactions on Pattern Analysis and Machine Intelligence, vol. 12, No. 6, Jun. 1990—Billur Barshan—'Differentiating Sonar Reflections from Corners and Planes by Employing an Intelligent Sensor' (pp. 560–568).

IEEE Transactions on Robotics and Automation, vol. 9, No. 1, Feb. 1993—Herbert Peremans, et al—'A High–Resolution Sensor Based on Tri–aural Perception' (pp. 36–48).

National Science Foundation, An International Conference, Amsterdam, The Netherlands, 8–11 Dec. 1986—Roman Kuc et al—'Intelligent Autonomous Systems' (pp. 329–333).

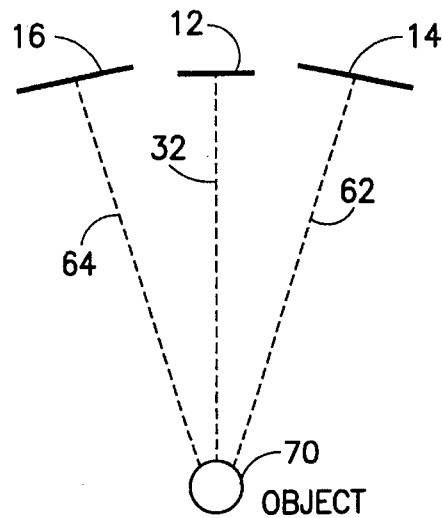
FIG. 5
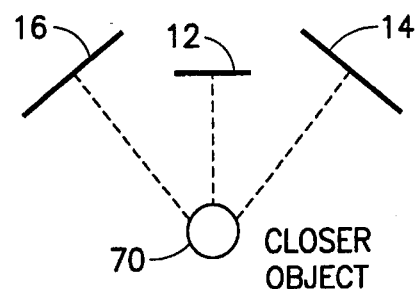
FIG. 7
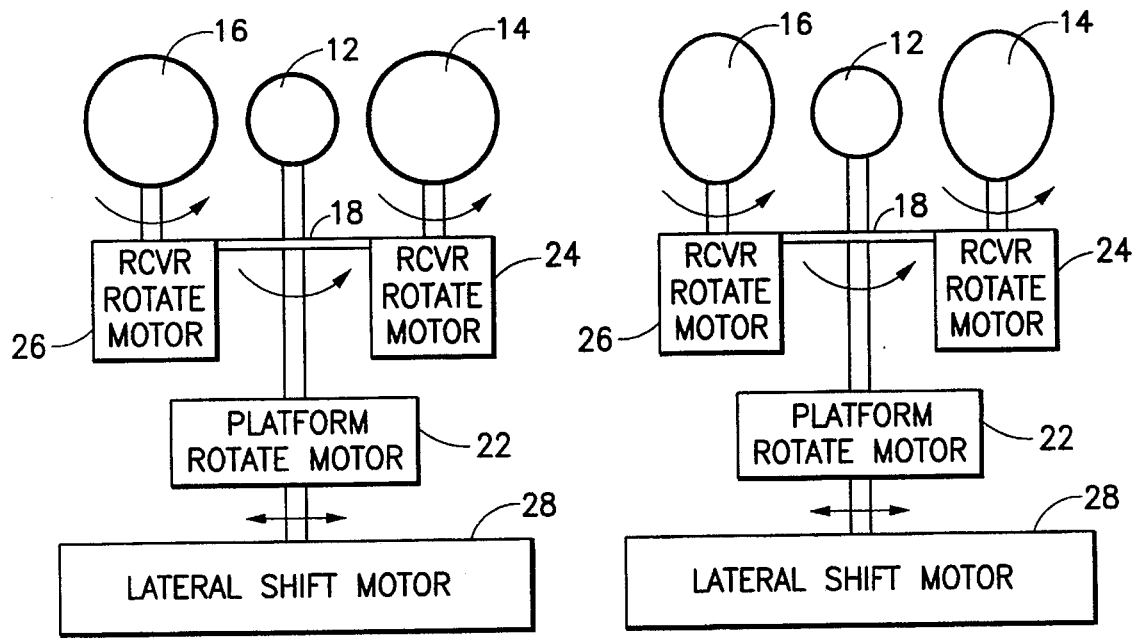
FIG. 6
FIG. 8

ADAPTIVE ACOUSTIC SIGNAL TARGET DETECTION SYSTEM

This is a continuation of application Ser. No. 08/350,278 filed on Dec. 5, 1994 now abandoned.

FIELD OF THE INVENTION

This invention relates to acoustic signal target detection systems and, more particularly, to an acoustic signal target detection system that is modeled after a biological navigation and ranging system and is adaptive in accordance with target position and reflection characteristics.

BACKGROUND OF THE INVENTION

Acoustic signal detection systems (also known as sonar, ultrasound, etc. systems) see application in many environments, e.g., medical, underwater targeting systems, robotic control, etc. At least two generations of acoustic signal sensing system precede this invention. The first generation employed single transducers and each sensor extracted time-of-flight of an emitted signal by threshold detection to locate a nearest obstacle lying along a particular direction. Multiple objects were detected and maps were generated by either rotating a single transducer or employing a ring of transducers operating separately. Such systems can be found described in "Sonar-Based Real World Mapping And Navigation", Elfes, IEEE Transactions On Robotics Automation, pages 249–265, 1987; and "The Sonar Ring: Obstacle Detection For A Mobile Robot" Walter Proceedings IEEE International Conference On Robotics Automation, pages 1574–1578, Raleigh, N.C., Mar. 31–Apr. 3, 1987.

A second generation of acoustic detection systems employed transducer arrays which consisted of two or more sensors. Such arrays processed echoes from a single emission to classify simple objects such as planes, corners and edges in terms of their echo characteristics. Such arrays allowed the identification and location of multiple objects from one location. Maps of identifiable features were generated by moving or rotating the array, however, the configuration of the array was fixed during operation. Such systems can be found described in the following references:

R. Kuc and Y. D. Di. Intelligent Sensor Approach To Differentiating Sonar Reflections From Corners and Planes. L. O. Hertzberger, editor, Intelligent Autonomous Systems, pages 329–333. Elsevier, Amsterdam, 1986.

B. Barshan and R. Kuc. Differentiating Sonar Reflections From Corners and Planes by Employing an Intelligent Sensor. IEEE Trans. Pattern Anal. Machine Intell., 12960:560–569, 1990.

H. Peremans, K. Audenaert and J. M. Van Campenhout. A High-Resolution Sensor Based on Tri-Aural Perception. IEEE Trans. Robotics Automation, 9(1)L36–48, 1993.

A. Sabatini. Active Hearing for External Imaging Based on an Ultrasonic Transducer Array. Proceedings IEEE/RSJ Int. Conf. on Intelligent Robots and Systems, pages 829–836, 1992.

Y. Nagashima and S. Yuta. Ultrasonic Sensing For a Mobile Robot to Recognize an Environment—Measuring the Normal Direction to Walls. IEEE/RSJ Int. Conf. on Intelligent Robots and Systems, pages 805–812, Raleigh, N.C., July, 1992.

For successful recognition of an object in an acoustic signal environment, the mechanism by which the features of an object produce echoes should be understood. The main echo producing mechanism is the abrupt change in cross-sectional area of an object that is exposed to an incident wave form. Such an abrupt change manifests itself in large specular echoes that are commonly observed in conventional sonar systems. However, smaller diffracted echoes are also produced by abrupt changes in the derivatives of the cross-sectional area of the object.

Using such echo information, attempts have been made to identify members of a given set of simple objects. The results were disappointing because observed differences in the echoes from a given object, located at different angles of the integrating beam, were as great as differences in echoes from different objects. See Sasaki et al. "Classification of Objects' Surface by Acoustic Transfer Function" Proceedings IEEE/RSJ International Conference on Intelligent Robots and Systems, pages 821–828, 1992.

To improve acoustic recognition of objects, template matching has been performed. To generate a set of templates, echoes from an object are observed at a number of receivers and are collected so that a template can be associated with each set of locations and stable orientations of an object. Templates enable a system to identify, locate and determine an object's orientation by associating received echoes with the stored templates that match the echo most closely (in a least-square error sense). In prior art reporting this finding, sensor placement was performed heuristically (see Richardson et al., "Acoustic Recognition of Objects in Robotics: Determination of Type, Pose, Position and Orientation", Acoustic Imaging, Vol. 16, pages 613–620, Plenum Press, NY, N.Y., 1988).

In order for template recognition to be effective, the number of templates must not be too large. As noted by Sasaki et al. above, the echo waveform changes significantly as the object location varies within the beam pattern. For recognition, a template must be available for every possible object location, resulting in an impractically large number of templates. The system incorporating the invention hereof and described below orients the object at a known location relative to the beam pattern of the transmitter and receivers. This known orientation "standardizes" the echo pattern received from an object and thus reduces the number of templates, making object recognition feasible.

Object recognition using acoustic signals evidences a number of problems when two or more sensors are employed. The first problem is termed "correspondence" and is manifested by an uncertainty at the receivers as to which echoes received by one receiver are to be paired with echoes appearing in another receiver. A second problem is termed "virtual" objects, wherein a multi-receiver system is confronted with objects which lie at approximately a same range within an echo producing region. Under such a condition, an acoustic sensing system derives an azimuth for the objects, which azimuth is aimed at a virtual object located somewhere between the two actual objects. In this case, since the azimuth does not point at a real object, the echoes received are different from those expected. This difference is exploited by the invention hereof to recognize the occurrence of virtual objects and as a means of directing the system so that it detects only actual objects.

It is known that certain mammals employ echo location for prey capture by emitting a series of acoustic pulses and processing the echoes. Both bats and dolphins employ such echo location modalities. Bat echo location systems are known to be especially effective in moderately open environments. Bats are known to turn their ears in the direction of a sound source and to move to observe an object from a different direction so as to enable a more precise determination of its identity.

Accordingly, it is an object of this invention to provide an improved acoustic sensing system which employs a target discrimination modality similar to that found in a biological system.

3

It is another object of this invention to provide an improved acoustic target detection system that is adaptive to altered target locations and ranges.

It is yet another object of this invention to provide an improved acoustic object detection system that is particularly adapted to use in robotic environments.

SUMMARY OF THE INVENTION

An acoustic ranging and detection system comprises an acoustic transmitter for producing an acoustic ranging signal and first and second acoustic receivers positioned on either side of the acoustic transmitter. A support mounts the acoustic transmitter and both acoustic receivers for concurrent rotation about a central axis passing through the acoustic transmitter. A first motor is connected to the first acoustic receiver and is adapted to impart independent rotative movement thereto. A second motor is connected to the second acoustic receiver and is adapted to impart independent rotative movement thereto. A control system is responsive to echo signals from a target that are received by the first and second acoustic receivers to rotate the support to point the transmitter at the target and further operates the first and second motors to cause the respective acoustic receivers to be repositioned so as to manifest receiving beam patterns which exhibit central axes that intersect in the region of the target. A translation motor is also connected to the support so as to enable a relative translation between the target and the transmitter and receivers so as to enable a differentiation between targets appearing at approximately the same distance from the acoustic receivers.

DESCRIPTION OF THE DRAWINGS

FIG. 5 is a plan view illustrating positioning of an acoustic transmitter and adjoining receivers for an object located at a substantial distance therefrom.

FIG. 6 is a schematic front view of the system of FIG. 1 under the target conditions illustrated in FIG. 5.

FIG. 7 is a plan view of the acoustic transmitter and adjoining receivers when the target is more closely positioned thereto.

FIG. 8 is a schematic front view of the system of FIG. 1 under the target conditions shown in FIG. 7.

DETAILED DESCRIPTION OF THE INVENTION

Figure 1:
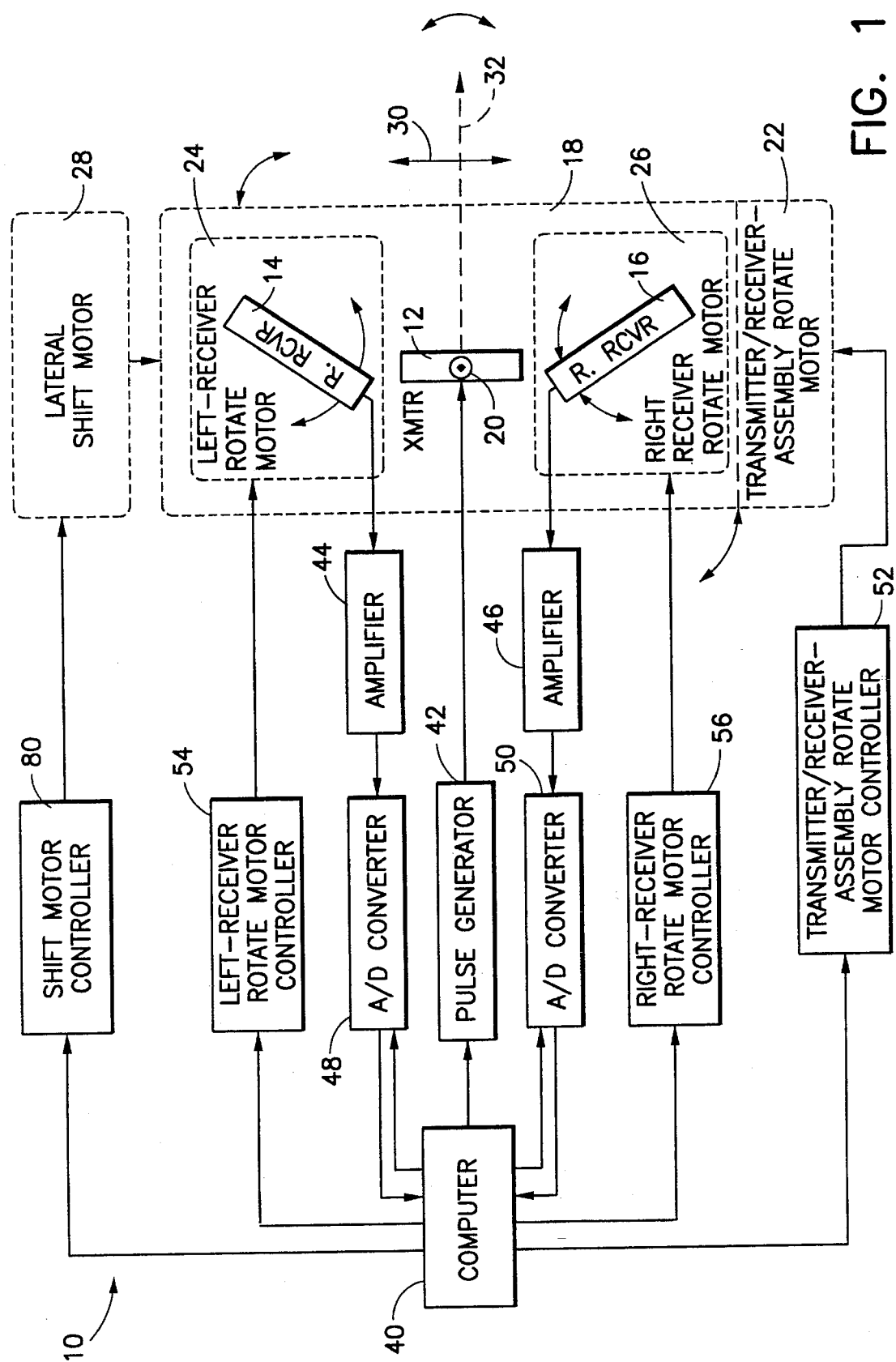
FIG. 1 is a block diagram of a system that incorporates the invention.

Referring now to FIG. 1, an acoustic ranging and detection system 10 is shown that includes a transmitter transducer 12, a left receiving transducer 14 and a right receiving transducer 16. Each of transducers 12, 14 and 16 are mounted on a platform 18 which is rotatable about a center line 20 that passes through transmitter transducer 12 and is perpendicular to the paper. A front view of the transducer structure is shown in FIG. 6.

A platform rotate motor 22 is controllable to cause platform 18 to rotate in either a clockwise or a counterclockwise direction so as to reorient transducers 12, 14 and 16, in tandem. A receiver rotate motor 24 is connected to left receiver transducer 14 and enables independent rotative movement thereof. A right receiver rotate motor 26 is connected to right receiver transducer 16 and enables independent rotative movement thereof. A lateral shift motor 28 enables lateral movement of platform 18 in the directions shown by arrows 30. Thus, it can be seen that by rotation of platform 18, the direction of propagation of signals from transmitter transducer 12 (as shown by dotted line 32) can be swept in azimuth. The movement of platform 18 causes concurrent movements of left receiver transducer 14 and right receiver transducer 16. Receiver rotate motors 24 and 26 enable further, independent rotation of their respectively connected receiver transducers.

A computer 40 controls the operation of system 10 and, via an appropriate input to pulse generator 42, enables generation of an output acoustic interrogating pulse from acoustic transmitter 12 along azimuth 32. Upon an echo being received by either left receiver transducer 14 or right receiver transducer 16 (or both), the received signal waveforms are fed through connected amplifiers (e.g. 44, 46) and analog-to-digital (A/D) converters (e.g. 48, 50) to computer 40. In accordance with a time difference between echo signals sensed by left receiver transducer 14 and right receiver transducer 16, computer 40 outputs a signal to transmitter/receiver-assembly rotate motor controller 52 which causes platform 18 to rotate in a direction to orient azimuth 32 towards the target. At the same time, computer 40 calculates appropriate angular orientations for left receiver transducer 14 and right receiver transducer 16 to assure that their effective beam patterns are directed so as towards the target. Appropriate controlling signals are then sent to left receiver rotate motor controller 54 and right receiver rotate controller 56 to cause a rotation of their respectively connected rotate motors to reposition the transducers into the desired beam pattern orientations.

The above described action (1) minimizes the echo producing region so as to reduce the area from which echo producing responses are detectable; (2) increases the amplitude of target signals at the transducers due to their optimum alignment with respect to the target; (3) assures optimum resolution by positioning the receiver transducers orthogonally to an incoming echo so as to detect the higher frequency components thereof; and (4) positions the target at a known location relative to the transmitter and receivers so as to standardize the echo pattern to assist in target recognition.

As indicated above, a preferred method for identifying target characteristics is to employ a template-matching procedure within computer 40. To accomplish successful template-matching, however, requires high quality echo returns whose frequency characteristics remain relatively undistorted as a result of processing through the receiving signal chain.

Figure 2:
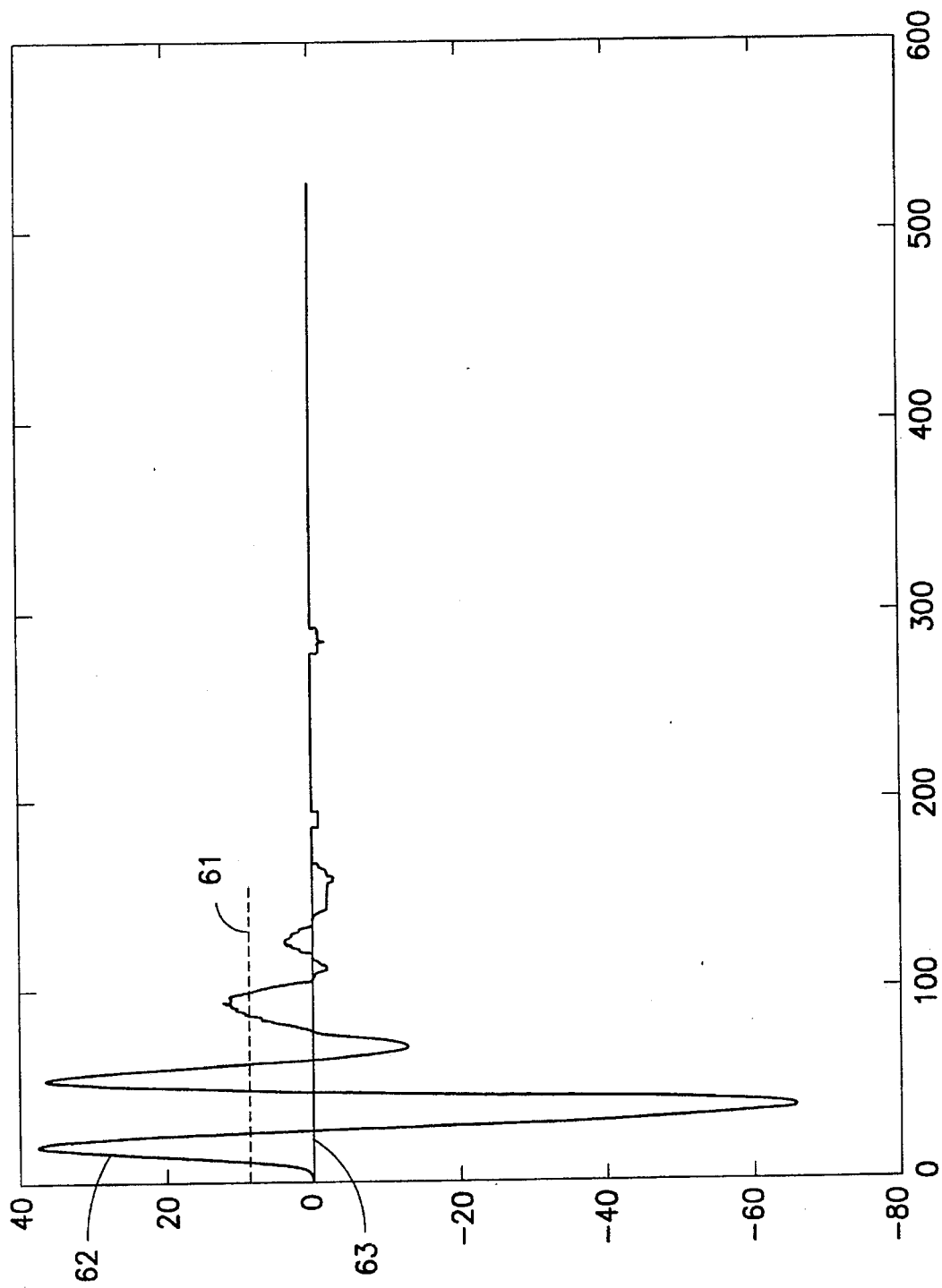
FIG. 2 illustrates a received acoustic echo pattern from a target.

The chart of FIG. 2 plots signal amplitude (in arbitrary units) versus time along the horizontal axis. As shown there, a received acoustic echo exhibits a plurality of cycles of decreasing amplitude. The time of arrival of an acoustic echo is determined by sensing the first crossing of a threshold level 61 by an incoming echo signal 62.

The time of arrival of an echo signal at either left receiver transducer 14 or right receiver transducer 16 is determined by the aforesaid intersection of an incoming echo pulse and threshold level 61. If a target is located at a position in space other than along azimuth 32, the time of arrival of echo pulse 62 at the respective receiver transducers will differ.

Figure 3:
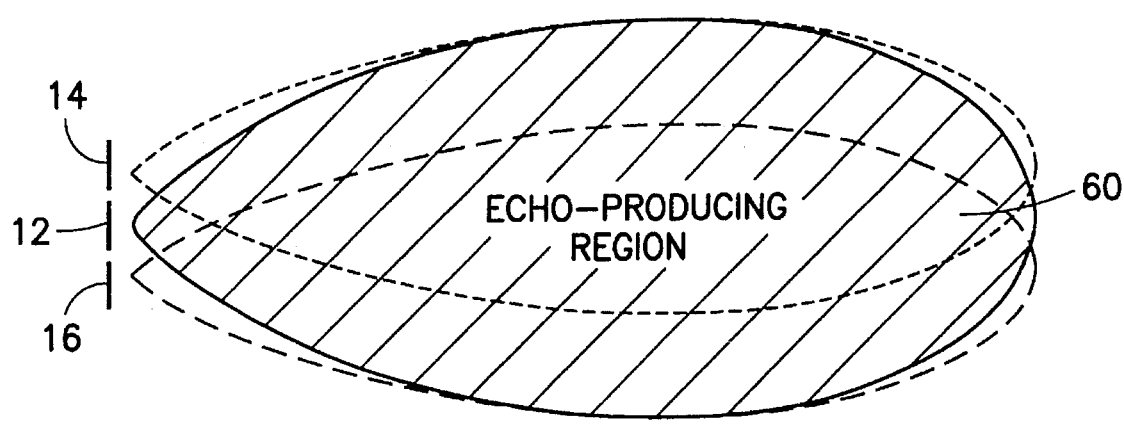
FIG. 3 illustrates beam patterns of a transmitter and adjoining receivers when all are coincidentally aligned along a single direction.

As shown in FIG. 3, during an initial search period, transmitter transducer 12 and left and right receiver transducers 14 and 16 are oriented along a plane so that the receiver beam patterns cover the transmitter beam pattern. This orientation allows any object that lies almost anywhere in the transmitter beam pattern to be detected by either the left or right receiver. This target-search echo-producing region is defined by the intersection of the transmitter beam with the union of the receiver beams. When however a target is detected and transmitter transducer 12 is directed at the target, left and right receiving transducers 14 and 16 are also rotated so as to direct their respective receiving beam patterns towards the target and in an overlapping manner which reduces the area of echo producing region 60. When a target is detected and located by the sonar system, the system processes echoes detected by both receivers. This target-track echo-producing region 60 is defined by the intersection of the three (transmitter and two receiver) beams. In essence, central axes 62 and 64 are redirected to intersect at approximately the position of the target.

In FIGS. 5 and 6, the orientation of left and right receiving transducers 14 and 16 (and transmitter transducer 12) are shown when an object is located at a substantial distance therefrom. Under such circumstances, platform 18 has been rotated to direct azimuth 32 towards object 70. Left and right receiver transducers 14 and 16 are also rotated to position center lines 62, 64 of their respective beam patterns at a point which intersects object 70. The frontal view of system 10 is shown in FIG. 6. When object 70 is more closely positioned to the aforesaid transducers (see FIG. 7), receiver rotate motors 24 and 26 cause their respectively connected left and right receiving transducers to be rotated in a more oblique manner so as to be directed at the object 70 (see also FIG. 8).

Note in FIGS. 6 and 8 that transmitter transducer 12 is somewhat smaller than right and left receiver transducers 14 and 16. The size differential results from the desire to provide a beam transmission pattern from transmitter transducer 12 that is as wide as possible but is still matched to the directional receiving patterns of right and left receiving transducers 14 and 16. By contrast, receiving transducers 14 and 16 are made large so as to increase their signal sensitivity to returned echoes, however the result is a somewhat narrower receiving beam pattern.

An experimental system was constructed in accordance with the block diagram of FIG. 1. Transmitter transducer 12 was an ultrasound transmitter that was resonant at 60 kHz and produced a longitudinal wave having a wavelength of 5.8 mm. The diameter of transmitter transducer 12 was 27 mm and the transmitted signal was contained within a conical beam. Transmitter transducer 12 was a Polaroid Corporation 7000 Series ultrasonic emitter.

Figure 4:
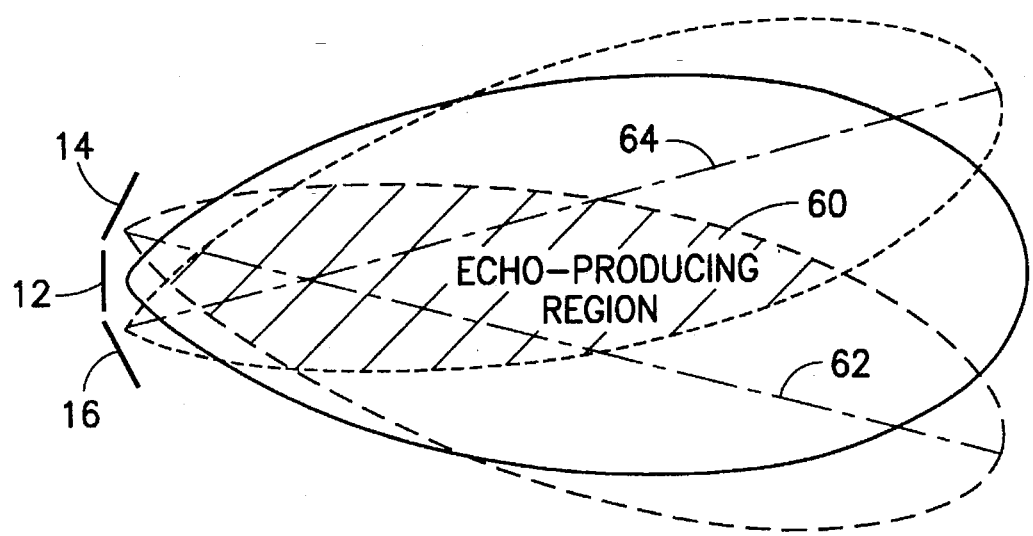
FIG. 4 is a plot of beam patterns when the two adjoining receivers have been rotated towards a target positioned within an echo-producing region.

Since the amplitude of a propagating pulse decreases as 1/r, where r is range, there is only a finite region of space, called the transmitter beam pattern and indicated in FIGS. 3 and 4, within which an object must be located to produce a detectable echo. Outside of this transmitter beam pattern, echoes from objects are too small to be detected at any possible orientation of receiving transducers 14 or 16. Initially, left and right receiving transducers 14 and 16 are pointed in the same direction as transmitter transducer 12.

For an echo from an object to be detected, two conditions must be met:

(1) the emitted pulse at the target object must be strong enough to produce a detectable echo, i.e., the target object must lie in the transmitter beam pattern; and (2) the target object must be located with respect to a receiver transducer so that echoes emitting from the target object are detectable by the receiving transducer, i.e., the target object must be within the receiver sensitivity beam pattern.

Hence, to produce an echo that is detectable by a receiving transducer, the target object must lie in the echo producing region 60 that is defined by the intersection of the transmitter and receiver beam patterns. The diameter of each of receiver transducers 14 and 16 is 40 mm and each receiver has a beam pattern that is narrower than the beam pattern of transmitter transducer 12 (receiver transducers and 16 are Polaroid Corp. instrument grade transducers).

In normal operation, system 10 proceeds through the following steps:

(1) Computer 40 sends a timing signal to pulse generator 42 indicating that a new interrogating pulse is to be emitted by transmitter transducer 12. Pulse generator 42 then produces an excitation wave form that cause transmitter transducer 12 to produce a short duration (wide frequency bandwidth) pulse.

(2) Computer 40 sends a command to A/D converters 48 and 50 to start sampling outputs from amplifiers 44 and 46 which amplify signals from left receiver transducer 14 and right receiver transducer 16, respectively. A/D converters 48 and 50 sample signals at a 1 MHz sampling rate to a resolution of 8 bits, producing numbers in the range of −128 to +127. When completed, 16,000 samples are acquired from each receiving transducer, corresponding to echoes from objects at a range not exceeding 2.8 meters.

(3) Computer 40 processes the data to determine if any echoes are present. The processing involves checking each fourth sample (for example) to determine an approximate sample number (time) wherein a first detected echo from either receiver transducer exhibits an amplitude that exceeds threshold level 61. At each transmission of an interrogation pulse, either an echo is detected or not detected.

(a) If an echo is not detected, computer 40 orients receiving transducers 14 and 16 in the same plane as transmitter transducer 12 and sends a command to transmitter/receiver-assembly rotate motor controller 52 to cause platform 18 to rotate one step clockwise. Platform rotate motor 22 is preferably a stepper motor that makes 200 steps per revolution. A 1:4 gear is employed to produce one complete revolution of platform 18 for each 800 steps produced by platform rotate motor 22. Computer 40 keeps a count of the number of clockwise rotate commands and when the count exceeds 75, the rotation direction is reversed to counterclockwise for the next 150 steps. Thereafter, the rotation direction is alternated every 150 steps, thus producing a scan that is +/−33.75° with respect to an initial orientation. At each step, computer 40 sends another timing signal to pulse generator 42, indicating that a new interrogation pulse is to be emitted by transmitter transducer 12.

(b) If an echo is detected, all succeeding samples from the point that threshold 61 is initially exceeded are processed from both left and right receivers transducers 14 and 16. For each receiver transducer, the data is processed to determine the point of the first zero crossing of waveform 62 (i.e., point 63 in FIG.

2). The sample count at that zero crossing is then decreased by 17 samples corresponding to ½ a period to produce an "echo arrival time". The following action depends upon whether both left receiver transducer 14 and right receiver transducer 16 detect echoes or only one receiver transducer detects an echo;

(i) If both left and right receiver transducers 14 and 16 generate echo arrival times, computer 40 uses these values to determine the location of the target object. If $T_L$ and $T_R$ are the travel times detected by computer 40 for left and right receiver transducers 14 and 16, c is the wave velocity of sound in air and D is the separation between the middles of transmitter transducer 12 and each of left and right receiver transducers 14 and 16, then range r and bearing Θ relative to transducer 12 is given by $$r = \frac{(cT_L)^2 + (cT_R)^2 - 2D^2}{2c(T_L + T_R)} \quad (1)$$

$$\theta = \arcsin\left(\frac{(c^2 T_L T_r + D^2)(cT_L - cT_R)}{D(c^2 T_L^2 + c^2 T_R^2 - 2D^2)}\right) \quad (2)$$

Given the values of r and Θ, computer 40 commences an adaption of each of the receiver transducer orientations to maximize returned echo signals from the target object. The value of Θ is indicative of the angle of the target object relative to azimuth 32 (FIG. 1). Thus, from the value of Θ, the transmitter/receiver assembly rotate motor controller 52 is operated to rotate platform 18 in a direction to make Θ equal 0. Then, the target object, or the first echo-producing feature of the target object, is positioned along transmitter azimuth 32, thus maximizing the strength of the emitted pulse that is impinging on the target object.

When Θ is expressed in radians, the full number of steps to be taken to rotate platform 18 is computed as $$N_{t/r} = \frac{\theta}{(2\pi/800)} \quad (3)$$

the denominator being the angular increment per step of transmitter/receiver-assembly rotate motor 22. A more robust performance is obtained when only one step of platform rotate motor 22 is performed for each transmitted pulse. Thus if, for some reason, platform rotate motor moves in a direction which reduces the strength of the return signal, that error can be rapidly corrected upon the next echo signal.

From the value of r, an angle φ of the target object relative to each receiver transmitter can be determined from $$\phi = \arctan(D/r) \quad (4)$$

Then, knowing φ, each of left and right receiver transducers 14 and 16 is positioned so that the target object is positioned along each receiver axis 62, 64. Such rotation is accomplished by computer 40 sending commands to left and right receiver rotate motor controllers 54, 56. The rotation angle increment of the receiver motor is Δφ radians, when φ is expressed in radians, results in the full number of steps being computed as $$N_r = \frac{\phi}{(\Delta\phi)} \quad (5)$$

When left receiver rotate motor 24 is driven clockwise, right receiver motor 26 is driven counter-clockwise. Here again, a more robust performance is obtained when only one step is made in the desired direction per transmitted pulse, until receiving transducers 14 and 16 are pointed at the object.

(ii) if only receiving transducer 14 or 16 detects an echo, the transmitter/receiver-assembly rotate motor 52 is controlled by computer 40 to rotate in the direction indicated by the receiving transducer which detected the echo. By turning the transmitter/receiver-assembly rotate motor towards the receiver which received the signal, the target object is brought into echo producing region 60 of the system so that, eventually, both receiving transducers will detect echoes.

When multiple target objects are present, the problem of "virtual objects" may occur. Acoustic transmitter transducer 12 is aimed by determining the location of a target object from the first echoes detected at both receiver transducers 14 and 16. In most cases, a single object is the source of both echoes and system 10 behaves as expected. In certain cases, however, two different objects lying at approximately a same range within echo producing region 60 produce such echoes. Then computer 40 will aim azimuth 32 at a virtual object located somewhere between the two target objects. Under such a condition, because azimuth 32 is not pointing at a real object, the echo signatures are different from those expected and do not match one or more templates contained within computer 40. For example, since the actual target object lies off-axis for transmitter 12 and receiver transducers 14 and 16, (because all of the transducers are pointed at a virtual object), the first echoes at each receiver transducer will be smaller than that which should have been produced by any expected object.

By setting a first echo energy level threshold, this condition can be identified by a threshold comparison within computer 40. In response, computer 40 generates a command to a shift motor controller 80 to shift platform 18 in a lateral direction (as indicated by arrows 30) until a range difference between the target object becomes sufficiently great so that a first echo is received from a closer target object. By thus translating platform 18, the presence of two or more targets at a substantially identical initial range can be detected and the echo producing targets discriminated.

The system shown in FIG. 1 largely avoids a further problem termed the "correspondence" problem. That problem can be stated as: "which echoes from the right receiver transducer are to be paired with echoes in the left receiver transducer?" In the system shown in FIG. 10, the correspondence problem is not major since most of the time the system automatically determines the closest object. In the case where multiple object recognition is desired, echoes beyond the first arrivals are grouped (by computer 40) into "buckets" and are then processed on a bucket to bucket basis, to recognize objects anywhere within the range of a specific bucket.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed:

1. An acoustic ranging and detection system, comprising:

acoustic transmitter means for transmitting an acoustic ranging signal along a transmitter azimuth;

first acoustic receiving means positioned to a first side of said acoustic transmitter means and having a receiving beam pattern with a first central azimuthal axis;

second acoustic receiving means positioned to a second side of said acoustic transmitter means and having a receiving beam pattern with a second central azimuthal axis;

rotative means for mounting said acoustic transmitter means, first acoustic receiving means and second acoustic receiving means for concurrent rotation about an axis passing through said acoustic transmitter means;

first means for imparting independent rotative movement to said first acoustic receiving means;

second means for imparting independent rotative movement to said second acoustic receiving means; and a control system responsive to target reflection signals received at said first and second acoustic receiving means, for moving said rotative means so as to point said transmitter azimuth at said target and to operate said first and second means to counter-rotate said first acoustic receiving means and second acoustic receiving means so as to point both said first azimuthal axis and second azimuthal axis towards said target and to cause said first azimuthal axis and second azimuthal axis to intersect in a region of said target, to thereby reduce an echo producing region about said target.

2. The acoustic ranging and detection system as recited in claim 1, wherein said rotative means comprises:

a platform supporting said acoustic transmitter means, first acoustic receiving means and second acoustic receiving means; and motor means connected to said platform for rotating said platform.

3. The acoustic ranging and detection system as recited in claim 2, wherein said first means comprises a motor coupled to said first acoustic receiving means and said second means comprises a motor coupled to said second acoustic receiving means, both motors mounted for rotation with said platform.

4. The acoustic ranging and detection system as recited in claim 1, further comprising:

translative means connected to said rotative means for causing said rotative means to translate along a first axis which intersects an axis of a direction of propagation of said acoustic ranging signal, said translative means responsive to a signal from said control system to cause said rotative means to move along first said axis.

5. The acoustic ranging and detection system as recited in claim 4 wherein said control system operates said translative means upon determining that a first echo signal from a target object does not meet a signal amplitude criteria.

6. An acoustic ranging and detection system as recited in claim 1 wherein said control system is responsive to a time difference in sensed reflection signals from said first acoustic receiving means and second acoustic receiving means, to cause said rotative means to move said transmitter means so as to orient an axis, along which said acoustic ranging signal is generated, to be coincident with said target and, simultaneously, to cause said first means and second means to rotate said first acoustic receiving means and second acoustic receiving means, respectively to position central axes of receiving beam patterns thereof to intersect said central axis at said target.

7. An acoustic ranging and detection system, comprising:

an acoustic transmitter for transmitting an acoustic ranging signal;

a first acoustic receiver positioned to a first side of said acoustic transmitter and having a receiving beam pattern with a first central azimuthal axis;

a second acoustic receiver positioned to a second side of said acoustic transmitter means and having a receiving beam pattern with a second central azimuthal axis;

platform means for mounting said acoustic transmitter, first acoustic receiver and second acoustic receiver for concurrent rotation about an axis passing through said acoustic transmitter;

platform movement means for imparting rotational motion to said platform means about said axis;

first means for imparting independent rotative movement to said first acoustic receiver;

second means for imparting independent rotative movement to said second acoustic receiver; and a control system responsive to reflection signals from a target received at said first and second acoustic receivers for operating said platform movement means to rotate said platform in a direction to point said acoustic transmitter at said target and to operate said first and second means to counter-rotate said first acoustic receiver and second acoustic receiver so as to bring said first central azimuthal axis and second central azimuthal axis into a position of intersection in a region of said target and to thereby reduce an echo producing region about said target.

8. The acoustic ranging and detection system as recited in claim 7, further comprising:

translative means connected to said platform means for causing said platform means to translate along a first axis which intersects an axis of a direction of propagation of said acoustic ranging signal, said translative means responsive to a signal from said control system to cause said platform means to move along said first axis.

9. An acoustic ranging and detection system as recited in claim 7 wherein said control system is responsive to a time difference in sensed reflection signals from said first acoustic receiver and second acoustic receiver to cause said platform movement means to move said platform means and transmitter means in incremental steps to orient an azimuth axis along which said acoustic ranging signal is generated to be coincident with said target and, simultaneously, to cause said first means and second means to rotate, in incremental steps, said first acoustic receiver and second acoustic receiver to move central axes of receiving beam patterns thereof so that they intersect said azimuth axis at said target, said incremental steps occurring substantially simultaneously, and one step per acoustic ranging signal.

\* \* \* \* \*